(12) United States Patent
Allen et al.

(10) Patent No.: US 8,549,538 B2
(45) Date of Patent: Oct. 1, 2013

(54) COORDINATING COMMUNICATION MEDIUM STATE FOR SUBTASKS

(75) Inventors: Nicholas A. Allen, Redmond, WA (US); John A. Taylor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/727,066

(22) Filed: Mar. 18, 2010

(65) Prior Publication Data
US 2011/0231702 A1   Sep. 22, 2011

(51) Int. Cl.
*G06F 9/46* (2006.01)
(52) U.S. Cl.
USPC .......................................... 719/313; 718/100
(58) Field of Classification Search
USPC .................... 719/310, 313, 315; 718/100
See application file for complete search history.

(56) References Cited

U.S. PATENT DOCUMENTS

| | | |
|---|---|---|
| 5,339,392 A | 8/1994 | Risberg |
| 5,371,889 A | 12/1994 | Klein |
| 5,452,445 A | 9/1995 | Hallmark et al. |
| 5,465,328 A | 11/1995 | Dievendorff |
| 5,592,622 A | 1/1997 | Isfeld |
| 5,802,310 A | 9/1998 | Rajaraman |
| 5,913,213 A | 6/1999 | Wikstrom |
| 5,924,097 A | 7/1999 | Hill et al. |
| 5,974,442 A | 10/1999 | Adams |
| 6,185,197 B1 | 2/2001 | Cheung |
| 6,263,360 B1 | 7/2001 | Arnold |
| 6,332,150 B1 * | 12/2001 | Khan et al. .................... 715/207 |
| 6,353,834 B1 | 3/2002 | Wong |
| 6,425,017 B1 | 7/2002 | Dievendorff et al. |

(Continued)

FOREIGN PATENT DOCUMENTS

| | | |
|---|---|---|
| EP | 1198106 | 4/2002 |
| EP | 1873643 | 1/2008 |
| WO | WO2006118529 | 11/2006 |

OTHER PUBLICATIONS

Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.

(Continued)

*Primary Examiner* — Van Nguyen
(74) *Attorney, Agent, or Firm* — Workman Nydegger (57) ABSTRACT

The present invention extends to methods, systems, and computer program products for coordinating communication medium state for subtasks. Embodiments of the invention use a received view of the contents of a message to produce a stream of subtask messages. Subtask message properties are each connected to the mechanism for performing the state coordination pattern on the original message. Subtask messages may each have the same message contents as the original message or may have message contents that vary according to the subtask. A message processor may then consume subtask messages from the subtask message stream and perform the state coordination pattern on each subtask message to reflect partial forward progress executing the original message. The outcome of the state coordination pattern for the original message is responsive to the collective outcomes of the state coordination patterns for the subtask messages.

20 Claims, 4 Drawing Sheets

(56) References Cited

U.S. PATENT DOCUMENTS

| | | | |
|---|---|---|---|
| 6,463,480 B2 | 10/2002 | Kikuchi | |
| 6,484,196 B1 * | 11/2002 | Maurille | 709/206 |
| 6,609,178 B1 | 8/2003 | Ofer | |
| 6,687,735 B1 | 2/2004 | Logston et al. | |
| 6,748,583 B2 * | 6/2004 | Aizenbud-Reshef et al. | 717/127 |
| 6,817,018 B1 | 11/2004 | Clarke et al. | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson et al. | |
| 6,886,041 B2 | 4/2005 | Messinger | |
| 6,886,169 B2 | 4/2005 | Wei | |
| 6,968,395 B1 | 11/2005 | Lee | |
| 6,971,001 B1 | 11/2005 | Rolfs | |
| 6,983,322 B1 | 1/2006 | Tripp et al. | |
| 7,068,634 B2 | 6/2006 | Vanttinen | |
| 7,111,001 B2 | 9/2006 | Harris | |
| 7,149,976 B2 | 12/2006 | Yagati | |
| 7,154,901 B2 | 12/2006 | Chava et al. | |
| 7,200,676 B2 | 4/2007 | Christensen et al. | |
| 7,240,350 B1 | 7/2007 | Eberhard | |
| 7,318,109 B2 | 1/2008 | Liscano et al. | |
| 7,330,860 B2 | 2/2008 | Adiba | |
| 7,370,329 B2 | 5/2008 | Kumar | |
| 7,380,135 B2 * | 5/2008 | Nishimoto et al. | 713/193 |
| 7,392,057 B2 * | 6/2008 | Lee | 455/456.5 |
| 7,409,428 B1 | 8/2008 | Brabec | |
| 7,434,225 B2 * | 10/2008 | Groetzner et al. | 719/313 |
| 7,527,558 B2 | 5/2009 | Lavoie | |
| 7,543,181 B2 | 6/2009 | Buxton | |
| 7,565,451 B2 | 7/2009 | Cabrera | |
| 7,631,108 B2 | 12/2009 | Kesselman | |
| 7,640,249 B2 | 12/2009 | Smits | |
| 7,711,788 B2 | 5/2010 | Lev Ran et al. | |
| 7,743,109 B2 | 6/2010 | Kaminsky et al. | |
| 7,783,610 B2 | 8/2010 | Lin et al. | |
| 7,802,263 B2 | 9/2010 | Fuchs | |
| 7,865,684 B2 | 1/2011 | Michaylov | |
| 7,937,364 B1 | 5/2011 | Chandrasekaran | |
| 7,945,631 B2 | 5/2011 | Chkodrov et al. | |
| 8,095,935 B2 | 1/2012 | Paramasivam et al. | |
| 8,301,706 B2 | 10/2012 | Paramasivam | |
| 2001/0023482 A1 | 9/2001 | Wray | |
| 2002/0116538 A1 | 8/2002 | Chen | |
| 2004/0162901 A1 | 8/2004 | Mangipudi et al. | |
| 2004/0186918 A1 | 9/2004 | Lonnfors | |
| 2004/0268357 A1 | 12/2004 | Joy et al. | |
| 2005/0147057 A1 | 7/2005 | LaDue | |
| 2005/0195820 A1 | 9/2005 | Betts | |
| 2005/0219617 A1 | 10/2005 | Krishnaswamy | |
| 2005/0278270 A1 | 12/2005 | Carr | |
| 2006/0053163 A1 | 3/2006 | Liu | |
| 2006/0080579 A1 | 4/2006 | Rothman et al. | |
| 2006/0085797 A1 | 4/2006 | Connelly | |
| 2006/0101064 A1 | 5/2006 | Strong | |
| 2006/0136367 A1 | 6/2006 | Todd | |
| 2006/0146879 A1 | 7/2006 | Anthias et al. | |
| 2006/0149865 A1 | 7/2006 | Kirstein | |
| 2006/0155862 A1 | 7/2006 | Kathi et al. | |
| 2006/0187902 A1 | 8/2006 | Birch et al. | |
| 2006/0230062 A1 * | 10/2006 | Roy-Chowdhury et al. | 707/103 X |
| 2007/0005640 A1 | 1/2007 | Klein | |
| 2007/0027928 A1 | 2/2007 | Majumdar | |
| 2007/0109592 A1 | 5/2007 | Parvathaneni et al. | |
| 2008/0086567 A1 | 4/2008 | Langen et al. | |
| 2008/0288954 A1 | 11/2008 | Fuchs | |
| 2009/0132671 A1 | 5/2009 | Chkodrov et al. | |
| 2009/0133036 A1 | 5/2009 | Allen | |
| 2009/0133037 A1 | 5/2009 | Allen | |
| 2009/0199208 A1 | 8/2009 | Pinto | |
| 2009/0216793 A1 | 8/2009 | Szyperski | |
| 2009/0222794 A1 | 9/2009 | Pinto | |
| 2009/0282396 A1 | 11/2009 | Boyer | |
| 2009/0319911 A1 * | 12/2009 | McCann et al. | 715/752 |
| 2009/0320044 A1 | 12/2009 | Dar et al. | |

OTHER PUBLICATIONS

Onion, Fritz, "State Management in ASP.NET", informiT, May 30, 2003, 5 pages.

Allen, Nicholas, "Nicholas Allen's Indigo Blog—Future of Queuing", Windows Communication Foundation From the Inside, Dec. 1, 2008, 2 pages.

Notice of Allowance dated Jan. 18, 2012 in U.S. Appl. No. 12/767,091.

Office Action dated Mar. 12, 2012 in U.S. Appl. No. 12/019,041.

U.S. Appl. No. 13/432,341, filed Mar. 28, 2012, Allen.

Office Action dated Apr. 5, 2012 in U.S. Appl. No. 12/018,401.

U.S. Appl. No. 12/605,236, filed Apr. 26, 2010, Allen.

U.S. Appl. No. 12/767,091, filed Mar. 18, 2010, Allen.

Ceponiene, Lina, et al., "Transformation from Requirements to Design for Service Oriented Information Systems", ADBIS Research Communications, 2005, pp. 164-177.

Arbab, Farhad, "The Influence of Coordination on Program Structure", 1997 IEEE, pp. 300-309.

Zambonelli, Franco, et al., "Programmable Coordination Infrastructures for Mobility", 2001, 5 pages.

Arbab, Farhad, et al., "Coordination through Channel Composition", 2002, LNCS 2315, pp. 22-39.

Castro, Eva M., et al., Departamento de Ingenieria de Sistemas Telematicos Universidad Politecnica de Madrid DIT.UPM, "Reliable Multicast for Coordination of Cooperative Applications", http://jungla.dit.upm.es/~ecastro/ReliableMulticast/rmulticast.html, 1999, 1 page.

Guermouche, Abdou, et al., "A study of various load information exchange mechanisms for a distributed application using dynamic scheduling" Jan. 2005, 16 pages.

Albrecht, Jeannie, et al., "Remote Control: Distributed Application Configuration, Management, and Visualization with Plush", 2007, 16 pages.

Aaron Skonnard, Pluralsight, "A Developer's Introduction to Windows Communication Foundation (WCF).NET 4 Beta 1", Jul. 2009, 57 pages.

Bhatti, Nina T., et al., "A System for Constructing Configurable High-Level Protocols", 1995, 13 pages.

Lee, Whay Sing, et al., "An Efficient, Protected Message Interface", Nov. 1998, pp. 69-75.

Bhoedjang, Raoul A.F., "Communication Architectures for Parallel-Programming Systems", Jun. 2000, 282 pages.

Office Action dated Oct. 5, 2011 in U.S. Appl. No. 12/019,041.

Office Action dated Oct. 13, 2011 in U.S. Appl. No. 12/018,401.

Office Action dated Sep. 28, 2012 in U.S. Appl. No. 12/018,401.

Office Action dated Oct. 3, 2012 in U.S. Appl. No. 12/019,041.

U.S. Appl. No. 12/767,091, mailed Jun. 25, 2012, Notice of Allowance.

Office Action dated Oct. 17, 2012 cited in U.S. Appl. No. 12/605,236.

U.S. Appl. No. 13/655,162, filed Oct. 18, 2012, Paramasivam.

Load-Balancing for MySQL http://diku.dk/publikationer/tekniske.rapporter/rapporter/03-1.pdf (67 pages) Fall 2003—Dennis haney & Klaus S. Madsen.

Planning for Reliability and High Availability http://msdn.microsoft.com/en-us/library/ms942932.aspx (32 pages) 2008—Microsoft Coorporation. [Retrieved from the internet May 21, 2008].

Distributed Computing with BEA WebLogic Server http://www-db.cs.wisc.edu/cidr/cidr2003/program/p26.pdf (11 pages) Jan. 5-8, 2003—Dean Jacobs—BEA Systems.

On Affinity Based Routing in Multi-System Data Sharing http://www.vldb.org/conf/1986/P249.PDF (8 pages) Aug. 1986—Phillip S. Yu, Douglas W. Cornell, Daniel M. Dias and Balakrishna R Iyler.

U.S. Appl. No. 12/484,741, mailed Jun. 27, 2012, Notice of Allowance.

Office Action dated Mar. 28, 2013 cited in U.S. Appl. No. 12/605,236.

Office Acton dated Apr. 4, 2013 cited in U.S. Appl. No. 12/019,041.

Notice of Allowance dated Apr. 10, 2013 cited in U.S. Appl. No. 12/018,401.

Office Action dated Apr. 12, 2013 cited in U.S. Appl. No. 13/655,162.

* cited by examiner

COORDINATING COMMUNICATION MEDIUM STATE FOR SUBTASKS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. One can appreciate, that while this ability to combine processing power through several different computer systems can be an advantage, there are various complexities associated with distributing application program modules.

For example, applications can change internal state in accordance with the contents of messages received over a communication medium. In addition to application state change, the communication medium can also change state (e.g., in that it no longer contains the message). Generally, the process of receiving a message involves at least two steps: a) an application accesses message content and b) the state of the communication medium is updated. When these two steps are coupled into a single receive function, coordinating the respective state changes in the application and the communication medium can be difficult.

For example, the delivery of a message alters the state of the communication medium in that the message is no longer present in the communication medium following delivery. The receipt of a message also alters the state of an application determined by the particular custom logic of that application. The custom logic may require access to the contents of the message being delivered. Thus, processing difficulties (e.g., duplicate and inappropriate processing by competing application consumers) can occur when access to the contents of a message is coupled to the state change in the communication medium.

In some environments, the difficulties are partially addressed by allowing the application to execute the receive function on the communication medium and its own internal state change under the same two-phase commit transaction. However, under such circumstance the application is unable to use two-phase commit transactions as part of the process of deciding on its final state. This would happen, for example, if an application was executing multiple processing attempts to arrive at the final state.

Further complexities are also introduced when incomplete or partial state changes occur. That is, an application state change can represent forward progress processing received messages but not sufficient progress for a message to be deleted from a communication medium. These and similar complexities are prevalent in message processing systems that induce a number of independent subtasks. For example, message processing systems that process a message that is a batch of smaller messages or that process a message that invokes several processes in parallel can cause partial or incomplete state changes insufficient for deleting a message from a communication medium.

BRIEF SUMMARY

The present invention extends to methods, systems, and computer program products for coordinating communication medium state for subtasks. A message state coordinator receives a content view of the contents of a message along with a coordination property from the message consumer. The message consumer received the content view from a communication medium connected to computer architecture. Receipt of the content view indicates that the communication medium has locked the message for exclusive access by the consumer. The coordination property provides information on how the message consumer is to signal the disposition of the message back to the communication medium.

The message state coordinator divides the content view into a stream of subtask messages. Each subtask message corresponds to a partial application state update for an application and includes a subtask coordination property. Each subtask coordination property provides information on how to signal the disposition of a corresponding subtask message back to the message state coordinator.

One or more subtask consumers, from among a plurality of subtask consumers, send a message request to the subtask message stream. Each of the one or more subtask consumers receives a content view of the contents of a message from the subtask message stream along with a subtask coordination property for the content view. Receipt of the content view indicates that the subtask message stream has locked the subtask message for exclusive access by the subtask consumer. The subtask coordination property provides information on how to signal the disposition of the subtask message back to the subtask message stream.

Each of the one or more subtask consumers attempts to partially update application state for the application based on the corresponding received content view. Each of the one or more subtask consumers determines the disposition of the corresponding subtask message based on the attempted partial application state update. Each of the one or more subtask consumers using the corresponding subtask coordination property to signal the disposition of the corresponding subtask message back to the subtask message stream.

The subtask message stream forwards the signaler to the message state coordinator. As such, for each subtask message, the message state coordinator receives one or more subtask signals from subtask consumers that consumed the subtask message. The one or more subtask signals indicate the disposition of the subtask message. The message state coordinator determines the disposition of the message based on any received subtask signals. The message state coordinator uses the coordination property for the message to signal the disposition of the message to the message consumer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for coordinating communication medium state for subtasks. A message state coordinator receives a content view of the contents of a message along with a coordination property from the message consumer. The message consumer received the content view from a communication medium connected to computer architecture. Receipt of the content view indicates that the communication medium has locked the message for exclusive access by the consumer. The coordination property provides information on how the message consumer is to signal the disposition of the message back to the communication medium.

The message state coordinator divides the content view into a stream of subtask messages. Each subtask message corresponds to a partial application state update for an application and includes a subtask coordination property. Each subtask coordination property provides information on how to signal the disposition of a corresponding subtask message back to the message state coordinator.

One or more subtask consumers, from among a plurality of subtask consumers, send a message request to the subtask message stream. Each of the one or more subtask consumers receives a content view of the contents of a message from the subtask message stream along with a subtask coordination property for the content view. Receipt of the content view indicates that the subtask message stream has locked the subtask message for exclusive access by the subtask consumer. The subtask coordination property provides information on how to signal the disposition of the subtask message back to the subtask message stream.

Each of the one or more subtask consumers attempts to partially update application state for the application based on the corresponding received content view. Each of the one or more subtask consumers determines the disposition of the corresponding subtask message based on the attempted partial application state update. Each of the one or more subtask consumers using the corresponding subtask coordination property to signal the disposition of the corresponding subtask message back to the subtask message stream.

The subtask message stream forwards the signaler to the message state coordinator. As such, for each subtask message, the message state coordinator receives one or more subtask signals from subtask consumers that consumed the subtask message. The one or more subtask signals indicate the disposition of the subtask message. The message state coordinator determines the disposition of the message based on any received subtask signals. The message state coordinator uses the coordination property for the message to signal the disposition of the message to the message consumer.

Accordingly, in some embodiments a message receive function (either at an initial consumer or a subtask consumer) is separated into an access action and a separate lock action. A consumer executes those actions separately while performing an internal state update between them. The separation permits a consumer to determine its final state before signaling the completion of the receive operation to the communication medium or subtask message stream (e.g., a logical delete of the message from the communication medium or subtask message stream).

An application can be distributed into several competing consumers. In a first discrete action, one of the consumers or subtask consumers accesses (or "peeks" at) the contents of a message. In a second discrete action, the communication medium or subtask message stream locks the message to the accessing consumer or subtask consumer respectively for the duration of message receipt. The message access or "peek" can trigger the message lock. Thus, the separation of actions also significantly increases the chance that the application receives the message only once.

The state coordination can be further enhanced by allowing the consumers to use a two-phase commit transaction around its internal state change and the delete operation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
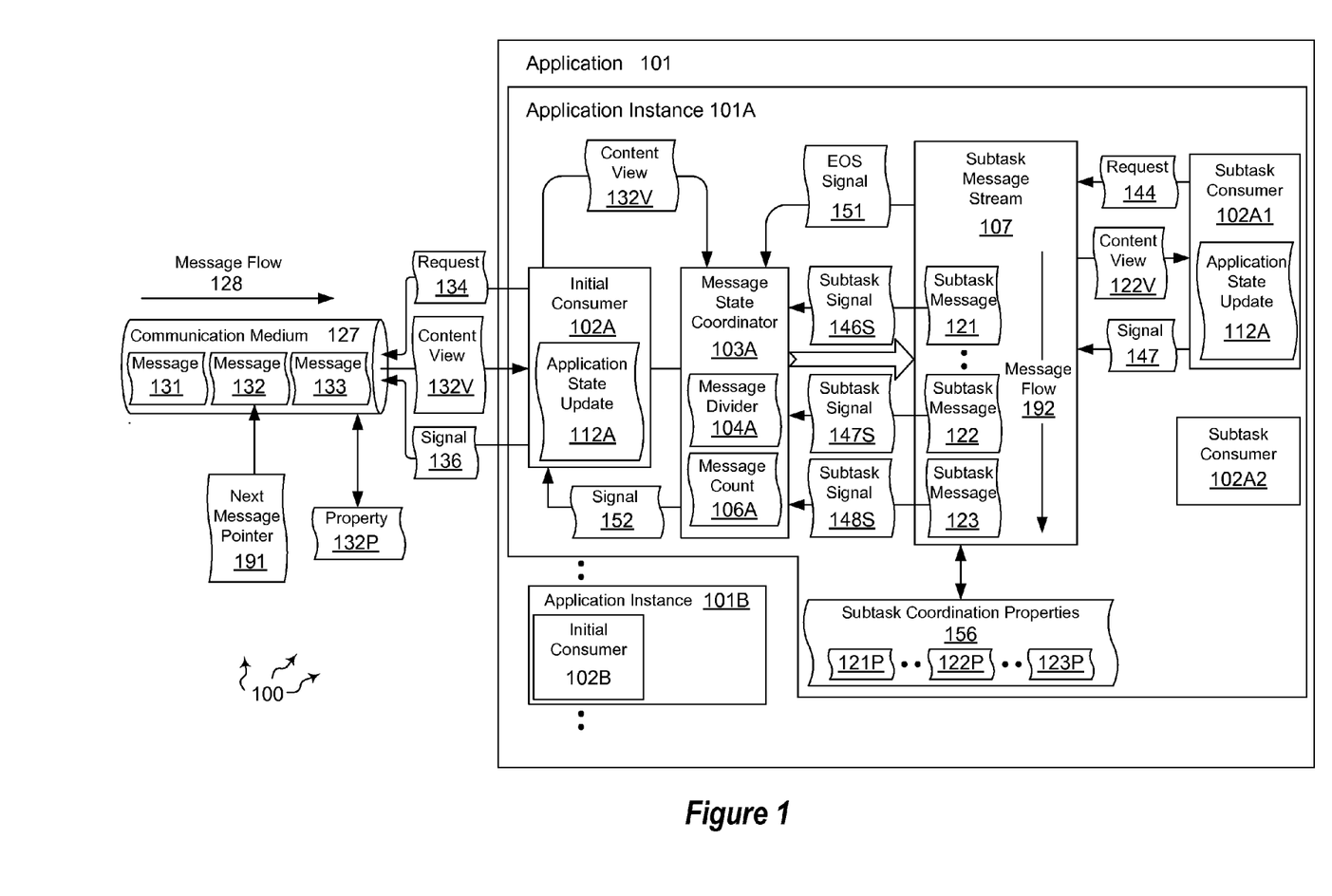
FIG. 1 illustrates an example computer architecture that facilitates coordinating communication medium state for subtasks.

FIG. 1 illustrates an example computer architecture 100 that facilitates coordinating communication medium state for subtasks. Referring to FIG. 1, computer architecture 100 includes communication medium 127, message flow 128, and application 101. Application 101 is distributed across a plurality of application instances, including application instance 101A and application instance 101B, potentially on different machines. Application instance 101A further includes initial consumer 102A, message state coordinator 103A, subtask consumer 102A1 and subtask consumer 102A2. Application instance 101B further includes initial consumer 102B and can also include other components similar to those included in application instance 101A.

Each of the depicted components can be connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Communication medium 127 can be virtually any type of medium, such as, for example, a queue system or database, that can provide messages to applications. Thus, communication medium 127 can carry message flow 128. Message flow 128 includes a plurality of messages including messages 131, 132, and 133.

The messages of message flow 128 can be sent from some other network connectable system or device for delivery to application 101. Alternately, message flow 128 can be from another application on the same computer system as application 101 or even between different application instances of application 101. That is, one application instance of application 101 can send a message to communication medium 127. Subsequently, another application instance of application 101 can receive the message from communication medium 127.

Initial consumers at each of the plurality of application instances can be competition consumers for messages on communication medium 127. For example, initial consumers 102A and 102B can be in competition for messages from communication medium 127.

For any number of reasons, such as, for example, scalability, the plurality of application instances (101A, 101B, etc.) can be physically distributed across a number of nodes. Each application instance can have a copy of application logic (for application 101) to compete for message delivered from communication medium 127. Thus, there can be several application instances of the application logic (for application 101) running concurrently, competing with each other for messages from communication medium 127.

In such an environment, one competing consumer can examine a message at a time. Communication medium 127 can lock a message that is being examined by an application instance. For example, communication medium 127 can lock message 133 when initial consumer 103B examines message 133.

When a message is locked, another competing consumer sees the next message in a message flow as the message immediately behind the locked message. Communication medium 127 can maintain a next message pointer to point to the next available message (or message that isn't already being examined by a consumer) in message flow 128. For example, communication medium 127 can maintain next message pointer 191. Thus, when initial consumer 102B is examining message 133, next message pointer 191 points to message 132. Accordingly, initial consumer 102A (as well as initial consumers at other application instances) sees message 132 as the next message.

Accordingly, initial consumer 102A is permitted to examine (or "peek" at) message 132 while communication medium 127 maintains a lock on message 133. After a state transition, initial consumer 102B can signal communication medium 127 to delete message 133. A delete signal completes the successful receipt of a message. Alternately, initial consumer 102B can also signal communication medium 127 to release the lock of (i.e., unlock) message 133 if application instance 101B cannot accept message 133. An unlock completes an unsuccessful receipt of a message.

In some embodiments, an application instance receives a message content from a communication medium by executing a receive function. The message content is the object returned by the execution of that receive function. In some embodiments, a receive function gives an application instance (initial consumer) a view on a locked copy of message contents. For example, consumer 102A can execute a receive function to have a view of the content of message 132 returned as an object to initial consumer 120A. In these embodiments, a standard receive function (e.g., one that returns the actual message) can be overloaded to return a view on a locked copy of a message (as opposed to the actual message). The overloading of the receive function facilitates a level of polymorphism within the application code, such as, for example, in a front-end message processing pipeline.

The message object can then be extended with a property associated with the message. The property is an abstraction of a portion of temporary state the communication medium is holding and associating with the message. The consumer interacts with the property to complete message receipt. When a locked view of message contents is provided to a consumer, the property can indicate that the view is locked (e.g., the value can be set to LOCKED). The property can be examined to prevent communication medium 127 from providing a view of the contents of the same message to another consumer. When processing of the view of the contents is complete, the consumer can signal either the delete of the message in the communication medium (e.g., set the value of the property to DELETED) or the release of the lock (e.g., set the value of the property to UNLOCKED).

Thus, the temporary state can be a message "lock" that prevents other competing consumers from accessing the contents of the message. Accordingly, one consumer can request to receive a message. In response to the request, the extended communication medium behavior provides a view of the contents of the message to the consumer and locks the message from other competing consumers. The one consumer can then complete the receive process with success (i.e., signal delete) or complete the receive process with failure (i.e., signal unlock).

For example, initial consumer 102A can send request 134 to communication medium 127. Request 134 can be a request for a message from communication medium 127. Communication medium 127 can receive request 134 and refer to next message pointer 191 to identify that message 132 is the next available message. When a message is locked, next message pointer 191 can be moved from the current message to the next message (communication medium 127 can be first in first out ("FIFO") in accordance with message flow 128). Thus, when message 133 is locked (i.e., another consumer, for example, initial consumer 102B, is viewing the contents of message 133), next message pointer 191 can be adjusted to point to message 132.

As such, in response to request 134, communication medium 127 can provide content view 132V (e.g., a view of the message body of message 132) to initial consumer 102A. Communication medium 127 can lock message 132 to prevent further access by other initial consumers, such as, for example, consumer 102B. Locking message 132 can include changing the value of a property 132P (or other temporary message state) for message 132 to LOCKED. Initial consumer 102A can receive content view 132V from communication medium 127. Initial consumer 102A can pass content view 132A along with access to property 132P to message state coordinator 103A.

Figure 2:
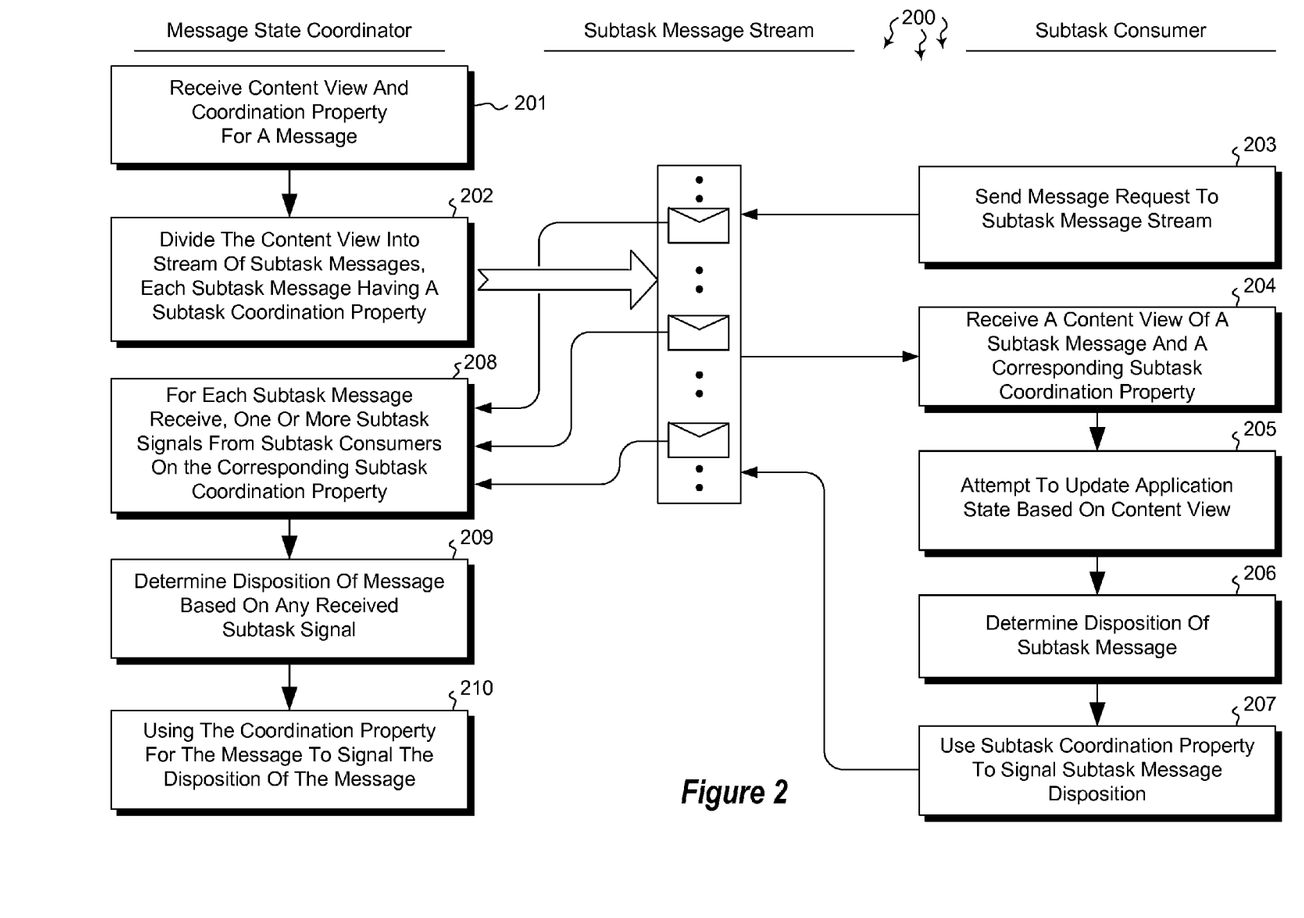
FIG. 2 illustrates a flow chart of an example method for coordinating communication medium state for subtasks.

FIG. 2 illustrates a flow chart of an example method 200 for coordinating communication medium state for subtasks. Method 200 will be described with respect to the components and data of computer architecture 100.

Method 200 includes an act of the message state coordinator receiving a content view a coordination property for a message (act 201). For example, message state coordinator 103A can receive content view 132A and access to property 132P from initial consumer 102A. Method 200 includes an act of the message state coordinator dividing the content view into a stream of subtask messages, each subtask message having a subtask coordination property (act 202). For example, message divider 104A can divide content view 132V into subtask message stream 107. Subtask message stream 107 can carry message flow 192. Message flow 192 includes a stream of subtask messages including subtask messages 121, 122, and 123. Each subtask message in message flow 192 corresponds to a partial application state update for an application 101 (e.g., a partial update of application state update 112A).

Each subtask message in subtask message stream 107 can contain a portion of the contents of content view 132V (and thus message 132). Alternately or in combination, message state coordinator 103A can vary the contents of subtask messages in subtask message stream based on subtask. For example, if two subtasks are to perform the same operation in parallel (perhaps using two different methods and taking the first alternative to complete as the answer) then the message contents are likely to be the same or substantially similar between the two subtasks. If on the other hand, the content view 132V represents a batch containing a variety of different tasks, the content of each subtask message may be specifically crafted to the operation being performed.

Each subtask message in message flow 192 is also associated with a subtask coordination property (similar to property 132P). The subtask coordination property provides information on how to signal the disposition of a corresponding subtask message (e.g., LOCK, UNLOCK, DELETE) back to the message state coordinator. For example, message state coordinator 103A can also create subtask coordination properties 156. Each subtask coordination property in subtask coordination properties 156 can correspond to a subtask message in message flow 192. For example, subtask coordination properties 121P, 122P, and 123P can correspond to subtask messages 121, 122, and 123 respectively. Although depicted separately, a subtask coordination property can alternately be stored along with each subtask message in a subtask message stream. For example, subtask coordination properties 121P, 122P, and 123P can be attached to or contained within subtask messages 121, 122, and 123 respectively.

In some embodiments, a message state coordinator uses reference counting to control the signaling of the original message. Upon initialization, the message state coordinator reference count is set to zero. The reference count is incremented by one for the subtask message stream and by one for each message placed in the subtask message stream. Further increments may be performed to implement message copying or to divide a subtask into sub-subtasks. The reference count is decremented by one for each signal (either from a subtask or the subtask message stream) received. A message state coordinator may use the reference count reaching zero as a trigger for signaling the disposition of the original message.

For example, message state coordinator can maintain reference count 106A. Upon creating substask message stream 107, message state coordinator 103A can set reference count 106A to one. Reference count 106A is further incremented as message state coordinator 103A places each subtask message (e.g., 121, 122, 123, etc.) in subtask message stream 107. When signals are received back from a subtask (indicating the disposition of a subtask message) or from subtask message stream 107 (e.g., indicating the end of subtask message stream 107), reference count 106A is decremented. Message state coordinator 103A can use reference count 106A reaching zero as a trigger for signaling the disposition of content view 132A back to initial consumer 102A.

Either the increment or decrement operations may be transactionally aware; thus, for example, the occurrence of a signal under a transaction may cause both the signal as well as the decrement operation to be undone if the transaction rolls back.

Method 200 includes an act of sending a request to the subtask message stream (act 203). For example, subtask consumer 102A1 can send request 144 to subtask message stream 107. Request 144 can be a request for a message from subtask message stream 107.

Subtask message stream 107 can receive request 144 and identify the next available message (e.g., using a next message pointer similar to next message pointer 191). For example, subtask message stream 107 can identify subtask message 122 as the next available message. As such, in response to request 144, subtask message stream 107 can send content view 122V (e.g., a view of the message body of message 122) to subtask consumer 102A1. Subtask message stream 107 can lock message 122 to prevent further access by other subtask consumers, such as, for example, subtask consumer 102A2. Locking message 122 can include changing the value of a subtask coordination property 122P (or other temporary message state) for message 122 to LOCKED. Subtask message stream 107 can also indicate the location of subtask coordination property 112P to subtask consumer 102A1.

Method 200 includes an act of receiving a content view of a subtask message and a corresponding subtask coordination property (act 204). For example, subtask consumer 102A1 can receive content view 122V from subtask message stream 107. Subtask consumer 102A1 can also receive an indication of the location of subtask coordination property from subtask message stream 107. Method 200 includes an act of attempting to update application state based on content view 122V (act 205). For example, subtask consumer 102A1 can attempt application state update 113A1 to partially update application state for application 101 based on content view 122V.

Method 200 includes an act determining the disposition of the subtask message (act 206). For example, subtask consumer 102A1 can determine the disposition of subtask message 122 based on the success or failure of application state update 113A1. A successfully state update can result from subtask consumer 102A1 processing content view 122A without error. On the other hand, an unsuccessful sate update can result when there is an error during subtask consumer 102A1's processing of content view 122A.

Method 200 includes an act of using the subtask coordination property to signal subtask message disposition (act 207). For example, subtask consumer 102A1 can use subtask coordination property 122P send signal 147 indicating the disposition of subtask message 122. Signal 147 can indicate that subtask message 122 is to be deleted or unlocked. For example, subtask consumer 102A1 can change the value of subtask coordination property 122P from LOCKED to UNLOCKED or from LOCKED to DELETED respectively. A signal to delete can be sent when application state update 113A1 is successful. On the other hand, a signal to unlock can be sent application state update 113A1 is unsuccessful.

Method 200 includes an act of for each subtask message receiving one or more subtask signals from subtask consumers on the corresponding subtask properties (act 208). For example, message state coordinator 103A can receive subtask signal 147S (corresponding to signal 147) indicating the disposition of subtask message 122. Subtask signal 147S can be based on a change to the value of subtask coordination property 122P (e.g., LOCKED to UNLOCKED or from LOCKED to DELETED respectively). As other subtask messages are processed at other subtask message consumers (e.g., at subtask consumer 102A2), message state coordinator 103A can also receive other subtask signals corresponding to other subtask messages. For example, message state coordinator 103A can receive signals 146S and 148S indicating the dispositions of subtask messages 121 and 123 respectively. When all the messages in subtask message stream 107 are processed, subtask message stream 107 can send end of stream (EOS) signal 151 to message state coordinator 103A. Other more complex semantics can also occur between message state coordinator 103A and a subtask consumer based on received subtask message disposition signals.

In some embodiments, production of messages from message state coordinator 103A depends on received subtask signals (146S, 147S, 148S, etc.) as well as perhaps other external events. For example, the failure or success of a subtask consumer to update application state can cause message state coordinator 103A to add, delete, or modify upcoming messages in subtask message stream 107 that have not yet been observed by a subtask consumer.

Figure 4:
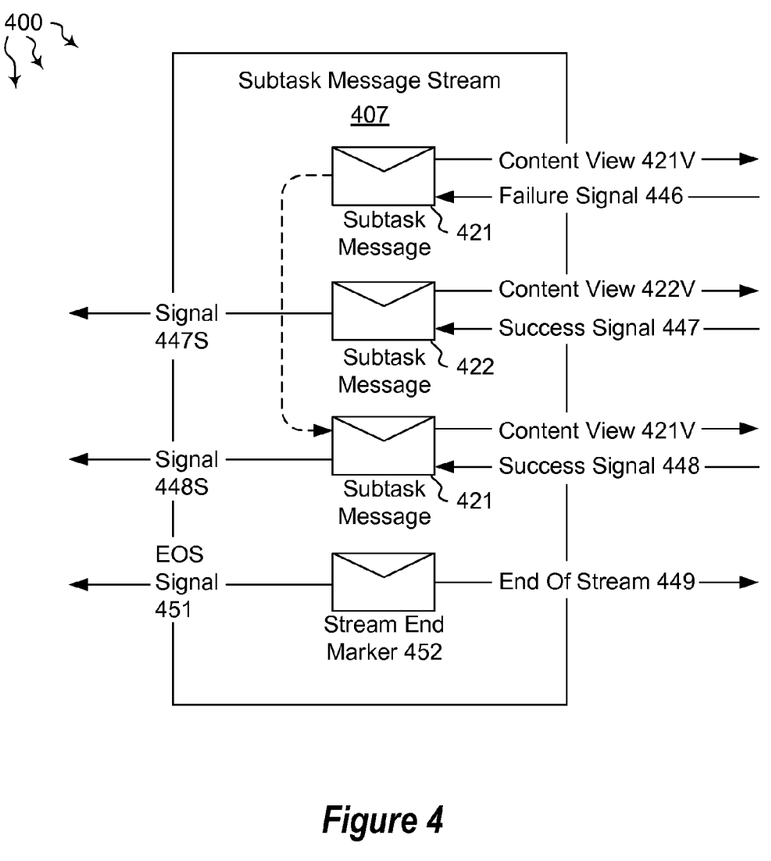
FIG. 4 illustrates an example computer architecture for reinserting a failed subtask message into a subtask message stream at a later point.

When a subtask message in a subtask message stream is UNLOCKED, the subtask message may again be available to other subtask consumers for processing. Thus, in some embodiments, a subtask message is retried. FIG. 4 illustrates example computer architecture 400 for reinserting a failed subtask message into subtask message stream 407 at a later point. A message state coordinator inserts subtask messages 421, 422, etc. into subtask message stream 407.

Content view 421V (of subtask message 421) is sent to a subtask consumer. Failure signal 446 is received back from the subtask consumer (indicating that subtask message 421 is to be unlocked). Content view 422V (of subtask message 422) is also sent to a subtask consumer. Success signal 446 is received back from the subtask consumer (indicating that subtask message 422 is to be deleted). The message state coordinator reinserts subtask message 421 back into subtask message stream 407 after subtask message 422.

Content view 421V (of subtask message 421) is again sent to a subtask consumer (which may be the same or a different subtask consumer). Success signal 448 is received back from the subtask consumer (indicating that subtask message 421 is to be deleted). End of stream marker 452 is reached. End of stream 449 is sent to subtask consumers and EOS signal 451 is sent to the message state coordinator.

Some embodiments of the invention include a mechanism for detecting when a message is a redelivery. For example, a unique identifier in combination with application bookkeeping can be used to track how many attempts to process a message have been made. Alternatively (and potentially more useful), a retry property can be attached to messages. The retry property can store a retry attempt count indicating how many attempts to process the message have occurred. For each attempt to process a message, the retry attempt count can be incremented.

Accordingly, it is possible for message state coordinator 103A to receive a plurality of signals, such as, for example, one or more unlock signals eventually followed by a delete signal, for a subtask message.

Method 200 includes an act of determining the disposition of the message based on any received subtask signals (act 209). For example, message state coordinator 103A can determine the disposition of message 132 based on subtask signals 146S, 147S, 148S, etc. When all subtask signals indicate successful partial state updates based on subtask messages, message state coordinator 103A determines the disposition of message 132 to be successful.

Additionally, when one or more subtasks do not alter the current disposition of message 132 (whether it is success or failure) and cannot be retried, message state coordinator 103A can discard remaining subtask messages from subtask message stream 107. Message state coordinator 103A can do this since processing any further subtask messages does not change the disposition of message 132. Message state coordinator 103A may also signal the disposition of message 132 without waiting for subtask signals from previously distributed subtask messages, when those subtask signals will not change the disposition from being failed.

In some embodiments the failure to successfully process a subtask message is a fatal error. For example, if processing of the subtask is essential and cannot be retried, then the failure of any one subtask indicates a failure for the original message. In these embodiments, message state coordinator 103A may be programmed to immediately determine the disposition of message 132 as failed upon receiving a failure signal for an essential subtask message that cannot be retired.

Method 200 includes an act of using the coordination property for the message to signal the disposition of the message (act 210). For example, message state coordinator 103A can send signal 152 to initial consumer 102A. Signal 152 indicates the disposition of message 132 as successful or failed. Message state coordinator 103A may wait for all subtask signals (146S, 147S, 148S, etc.) to signal success along with receiving a final signal (EOS signal 151) from subtask message stream 107 before signaling success for message 132. On the other hand, message state coordinator 103 may send signal 152 (indicated success or failure) when processing further subtask messages would not change the disposition of message 132. Signal 152 may or may not update property 132P directly.

Initial consumer 102A receives signal 152. Based on signal 152, initial consumer 102A can send signal 136 to communication medium 127. Signal 136 can indicate that message 132 is to be deleted or unlocked. For example, initial consumer 102A can change the value of property 132P from LOCKED to UNLOCKED or from LOCKED to DELETED respectively. A signal to delete can be sent when application state of application 101 is successfully updated. On the other hand, a signal to unlock can be sent when there is an error updating application state of application 101.

Communication medium 127 can receive signal 136 from initial consumer 102A. Communication medium 127 can update its state based on and in response to signal 136. For example, when the value of property 132P is changed from LOCKED to UNLOCKED, communication medium 127 can unlock message 132, making message 132 available to other application instances. On the other hand, when the value of property 132P is changed from LOCKED to DELETED, communication medium 127 can delete message 132.

Embodiments of the invention also include using other kinds of coordinating mechanisms between processes. For example, two-phase commit transactions can be used as a coordination mechanism between processes. When attempting to execute a process exactly one time, it is often advantageous to employ transactions in composition with the above described coordination mechanism. For the original message, a failure signal acts to abort (or rollback) the transaction while a success signal is an action that may be transactionally protected. An application may employ the above method together with a transaction to ensure that either all of the results performed under the transaction become visible or none of the results become visible.

In some embodiments, all subtasks are performed under a single transaction. In these embodiments, subtasks use the mode above in which the failure of any one subtask causes the entire process to fail. The transaction may be explicitly associated with the subtask message stream or may be "captured" the first time a signal is performed in the presence of an ambient transaction. Validation may be performed to check that all of the subtasks are performed under the same transaction (and that the disposition of the original message ultimately uses the transaction as well) by having the message state coordinator record the transaction used and compare it with any future transactions present during signaling operations.

An alternative embodiment for performing all of the subtasks under a single transaction may be used when the subtasks are idempotent or similarly supporting of at-least once execution. If a subtask can be executed more than once, then multiple processing attempts may be used to overcome failure. Thus, execution of the subtask may be performed outside of the scope of the transaction to prevent the transaction from rolling back during failure while the success signal is performed using the transaction. The end of session indication for the subtask message stream may be withheld until the transaction for the success signal is committed so that the subtask can still be replayed should the transaction be rolled back.

Another alternative embodiment for performing all of the subtasks under a single transaction uses nested transactions. A nested transaction provides a self-contained transaction scope within a larger transaction using a parent-child relationship. Thus, changes within the parent environment may be visible to the child while two child environments have their changes isolated from one another. The subtasks may be performed in child transactions subordinate to the transaction used for the original message.

Figure 3:
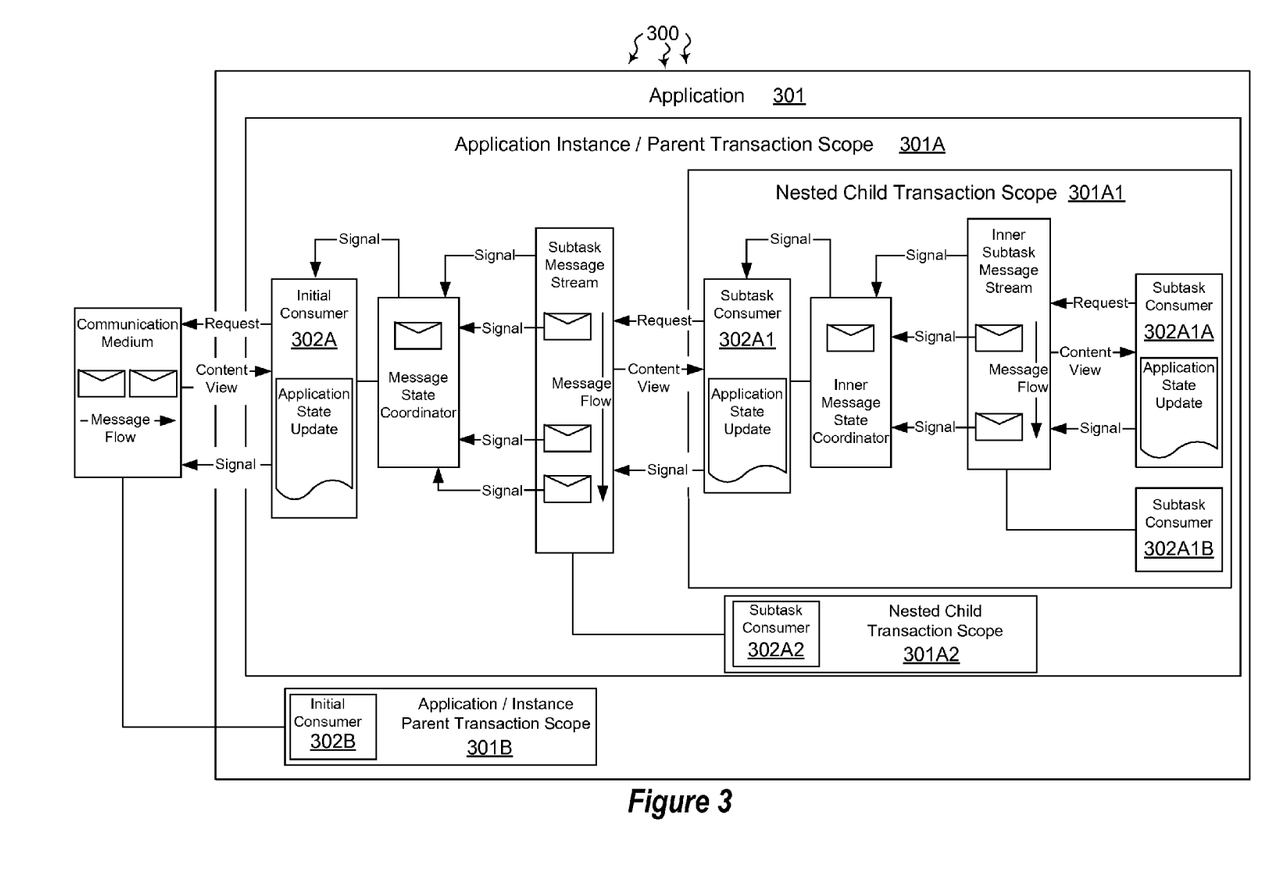
FIG. 3 illustrates an example computer architecture that facilitates coordinating communication medium state for subtasks in accordance with nested transaction scopes.

Turning to FIG. 3, FIG. 3 illustrates an example computer architecture 300 that facilitates coordinating communication medium state for subtasks in accordance with nested transaction scopes. As depicted, initial consumer 302A operates in application instance/parent transaction scope 301A. Initial consumer 302B operates separately in application instance/parent transaction scope 301B.

Further, within application instance/parent transaction scope 301A, different subtasks operate within different nested transactions. For example, subtask consumer 302A1 (as well as further subtasks consumers 302A1A and 302A1B) operates in nested child transaction scope 301A1. On the other hand, subtask consumer 302A2 operates in nested child transaction scope 301A2. Thus, changes within application instance/parent transaction scope 301A are visible to each of nested child transaction scopes 301A1 and 301A2. However, changes in nested child transaction scope 301A1 are isolated from nested child transaction scopes 301A2 and vice versa.

In further embodiments, when the association of subtasks within an original message is for convenience rather than indicating a unit of work boundary, the subtasks may even be performed using one or more transactions in any combination. The signal from the message state coordinator to the communication medium may occur subsequent to the one or more transactions committing. This signal for the original message may be performed under a further other transaction or perhaps even non-transactionally.

Accordingly, embodiments of the invention use a received view of the contents of a message to produce a stream of subtask messages. Each subtask message in the stream of subtask messages corresponds to an independent subtask. Each subtask message is associated with a delivery property mechanism for performing the state coordination pattern similar to that of the original message. Subtask message properties are each connected to the mechanism for performing the state coordination pattern on the original message.

Subtask messages may each have the same message contents as the original message or may have message contents that vary according to the subtask. A message processor may then consume subtask messages from the message stream and perform the state coordination pattern on each subtask message to reflect partial forward progress executing the original message. The outcome of the state coordination pattern for the original message is responsive to the collective outcomes of the state coordination patterns for the subtask messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture including one or more processors and system memory, the computer architecture also including a message state coordinator for coordinating state between an initial message consumer and a plurality of subtask consumers, a method for coordinating state between the initial message consumer and the plurality of subtask consumers, the method comprising:
   an act of the message state coordinator receiving a content view of the contents of a message along with a coordination property from the initial message consumer, the initial message consumer having received the content view from a communication medium connected to the computer architecture, receiving the content view indicative of the communication medium having locked the message for exclusive access by the initial message consumer, the coordination property providing information on how the initial message consumer is to signal the disposition of the message back to the communication medium;
   an act of the message state coordinator dividing the content view into a stream of subtask messages, each subtask message corresponding to a partial application state update for an application and each subtask message including a subtask coordination property, each subtask coordination property providing information on how to signal the disposition of a corresponding subtask message back to the message state coordinator;
   for each subtask message, an act of the message state coordinator receiving one or more subtask signals from subtask consumers that consumed the subtask message, the one or more subtask signals indicating the disposition of the subtask message;
   an act of the message state coordinator determining the disposition of the message based on the received subtask signals; and
   an act of the message state coordinator using the coordination property for the message to signal the disposition of the message to the initial message consumer.

2. The method as recited in claim 1, wherein the computer architecture includes a communication medium and one or more initial message consumers, including the initial message consumer, that consume messages from the communication medium, further comprising prior to the message state coordinator receiving the content view of the contents of the message:
   an act of the initial message consumer sending a message request to the communication medium;
   an act of the initial message consumer receiving the content view of the contents of the message along with the coordination property from the communication medium; and
   an act of the initial message consumer sending the content view of the contents of the message along with the coordination property to the message state coordinator.

3. The method as recited in claim 2, further comprising subsequent to signaling the disposition of the message to the initial message consumer:
   an act of the initial message consumer receiving the disposition of the message from the message state coordinator; and
   an act of the initial message consumer signaling the communication medium how to update communication medium state based on the received disposition of the message to coordinate the communication medium state with the application state.

4. The method as recited in claim 1, wherein the act of the message state coordinator dividing the content view into a stream of subtask messages comprises an act of dividing the content view into a stream of subtask messages that vary according to subtask.

5. The method as recited in claim 1, wherein the act of the message state coordinator dividing the content view into a stream of subtask messages comprises an act of dividing the content view into a stream of subtask messages that contain copies of the content view.

6. The method as recited in claim 1, wherein the act of the message state coordinator dividing the content view into a stream of subtask messages comprises an act of subsequent to receiving subtask signals from subtask consumers for a portion of the subtask messages in the stream of subtask messages, altering the subtask messages in the stream of subtask messages based on the one or more received subtask signals from subtask consumers.

7. The method as recited in claim 1, wherein for each subtask message, an act of the message state coordinator receiving one or more subtask signals from subtask consumers comprises an act of receiving signals indicating successful processing of all subtask messages; and wherein the act of the message state coordinator determining the disposition of the message comprises an act of determining that the disposition of the message is successful based on the received signals indicating successful processing of all subtask messages.

8. The method as recited in claim 1, wherein for each subtask message, an act of the message state coordinator receiving one or more subtask signals from subtask consumers comprises an act of receiving signals indicating failed processing of at least one subtask message.

9. The method as recited in claim 8, further comprising:
an act of the message state coordinator inserting one or more retry subtask messages into the subtask message stream based on the at least one subtask message;
an act of the message state coordinator receiving one or more subtask signals from subtask consumers that consumed the one or more retry subtask messages;
and wherein the act of the message state coordinator determining the disposition of the message based on the received subtask signals comprises an act of the message state coordinator determining the disposition of the message based on the received one or more subtask signals for the one or more retry subtask messages.

10. The method as recited in claim 8, wherein the act of the message state coordinator determining the disposition of the message comprises an act of determining that the disposition of the message is failed based on the received signal indicating that a subtask message failed.

11. The method as recited in claim 1, wherein for each subtask message, an act of the message state coordinator receiving one or more subtask signals from subtask consumers comprises an act of receiving transaction disposition notifications from subtask consumers in different transactions.

12. The method as recited in claim 11, wherein the different transactions are one or more nested transactions contained in a common parent transaction.

13. In a computer architecture including one or more processors and system memory, the computer architecture also including a plurality of subtask consumers that process messages from a subtask message stream, the subtask message stream including a stream of subtask messages, each subtask message having been divided from a message received at a consumer and corresponding to a partial application state update for the message received at the consumer, a method for coordinating state between a subtask consumer and the subtask message stream, the method comprising:

an act of a subtask consumer, from among the plurality of subtask consumers, sending a message request to the subtask message stream;
an act of the subtask consumer receiving a content view of the contents of a message from the subtask message stream along with a subtask coordination property for the content view, receiving the content view indicative of the subtask message stream having locked the subtask message for exclusive access by the subtask consumer, the subtask coordination property providing information on how to signal the disposition of the subtask message back to the subtask message stream;
an act of the subtask consumer attempting to partially update application state for an application based on the content view;
an act of determining the disposition of the subtask message based on the attempted partial application state update; and
an act of the subtask consumer using the subtask coordination property to signal the disposition of the subtask message back to the subtask message stream.

14. The method as recited in claim 13, wherein the act of a subtask consumer, from among the plurality of subtask consumers, sending a message request to the subtask message stream comprises a subtask in one nested transaction scope sending a message request to the subtask message stream, the one nested transaction isolated from other nested transactions of other subtask consumers.

15. The method as recited in claim 13, wherein determining the disposition of the subtask message based on the attempted partial application state update comprises an act of determining the attempted application state update successfully transitioned the application to a next state; and wherein the act of the subtask consumer using the subtask coordination property to signal the disposition of the subtask comprises an act of the subtask consumer using the subtask coordination property to signal that the subtask message is to be deleted from the subtask message stream.

16. The method as recited in claim 13, wherein determining the disposition of the subtask message based on the attempted partial application state update comprises an act of determining the attempted application state update failed to transition the application to a next state; and wherein the act of the subtask consumer using the subtask coordination property to signal the disposition of the subtask comprises an act of the subtask consumer using the subtask coordination property to signal that the subtask message is to be unlocked.

17. The method as recited in claim 16, further comprising:
an act of a second subtask consumer, from among the plurality of subtask consumers, sending a message request to the subtask message stream;
an act of subsequent to the subtask consumer unlocking the failed message, the second subtask consumer receiving a content view of the contents of a message from the subtask message stream along with a subtask coordination property for the content view, receiving the content view indicative of the subtask message stream having locked the subtask message for exclusive access by the subtask consumer, the subtask coordination property providing information on how to signal the disposition of the subtask message back to the subtask message stream, the received message based on the failed message;
an act of the second subtask consumer attempting to partially update application state for an application based on the content view;
an act of determining the disposition of the subtask message based on the attempted partial application state update; and
an act of the second subtask consumer using the subtask coordination property to signal the disposition of the subtask message back to the subtask message stream.

18. The method as recited in claim 17, further comprising:
an act of the subtask consumer recording a record of the failed attempted application state update;
wherein the received message based on the failed message includes one or more processing failure message properties based on the recorded record; and
wherein the act of the second subtask consumer attempting to partially update application state for an application based on the content view comprises an act of the second subtask consumer attempting to partially update application state for an application based on at least a portion of the processing failure message properties.

19. A computer system, the computer system comprising:
a plurality of machines, each machine including:
one or more processors;
system memory;
a communication medium, the communication medium having a message flow of messages to the computer system;
one or more computer storage media having stored thereon computer-executable instructions representing an application, wherein the executable instructions can be executed to create a plurality of application instances that are distributed across the plurality of machines and compete for messages from the communication medium, wherein each application instance includes an initial consumer, at least one message state coordinator, and at least one subtask consumer, wherein the initial consumer is configured to:
send a message request to the communication medium;
receive a view of the contents of a message along with a coordination property from the communication medium, receiving the content view indicative of the communication medium having locked the message for exclusive access by the initial consumer;
send the content view of the contents of the message along with the coordination property to the message state coordinator;
receive the disposition of the message from the message state coordinator; and
signal the communication medium how to update communication medium state based on the received disposition of the message to coordinate the communication medium state with the application state;
wherein the at least one message state coordinator is configured to:
receive the content view of the contents of a message along with a coordination property from the initial message consumer;
divide the content view into a stream of subtask messages, each subtask message corresponding to a partial application state update for an application and each subtask message including a subtask coordination property, each subtask coordination property providing information on how to signal the disposition of a corresponding subtask message back to the message state coordinator;
for each subtask message, receive one or more subtask signals from subtask consumers that consumed the subtask message, the one or more subtask signals indicating the disposition of the subtask message;
determine the disposition of the message based on the received subtask signals; and
use the coordination property for the message to signal the disposition of the message to the initial message consumer; and
wherein each of the plurality of subtask consumers are configured to:
send a message request to the subtask message stream;
receive a content view of the contents of a message from the subtask message stream along with a subtask coordination property for the content view, receiving the content view indicative of the subtask message stream having locked the subtask message for exclusive access by the subtask consumer, the subtask coordination property providing information on how to signal the disposition of a the subtask message back to the subtask message stream;
attempt to partially update application state for an application based on the content view;
determine the disposition of the subtask message based on the attempted partial application state update; and
use the subtask coordination property to signal the disposition of the subtask message back to the subtask message stream.

20. The computer system of claim 19, wherein each of the plurality of subtask consumers are in a different nested transaction scope isolated from the nested transaction scopes of other subtask consumers.

\* \* \* \* \*